United States Patent [19]

Johnson

[11] Patent Number: 5,115,484

[45] Date of Patent: May 19, 1992

[54] MULTIPURPOSE OPTICAL FIBER CONNECTOR

[75] Inventor: Paul D. Johnson, Knightdale, N.C.

[73] Assignee: Square D Company, Palatine, Ill.

[21] Appl. No.: 634,660

[22] Filed: Dec. 27, 1990

[51] Int. Cl.$^5$ .................................................. G02B 6/38
[52] U.S. Cl. ........................................... 385/72; 385/88
[58] Field of Search ................... 350/96.2, 96.21, 96.22

[56] References Cited

U.S. PATENT DOCUMENTS

| | | | |
|---|---|---|---|
| 4,261,774 | 4/1981 | Lewis et al. | 156/86 |
| 4,418,983 | 12/1983 | Bowen et al. | 350/96.21 |
| 4,896,939 | 1/1990 | O'Brien | 350/96.23 |
| 4,911,518 | 3/1990 | Miller | 350/96.20 |

Primary Examiner—Frank Gonzalez
Attorney, Agent, or Firm—Michael J. Femal

[57] ABSTRACT

A device for connecting standard plastic covered fiber optic cable and armored fiber optic cable to a housing for electrical or electronic equipment. The device consist of a portion of the housing having a passage between an exterior surface of the housing and a interior surface of the housing. At the interior end of the passage is an aperture sized to receive a standard plastic covered fiber optic cable. The passage is tapered such that the interior end has a smaller diameter than the exterior end and the passage is threaded. A bushing is received in the passage. The bushing has a passage through its center through which the fiber optic cable passes. One end of the bushing is threaded and has an aperture in the center thereof sized for receiving a standard plastic covered fiber optic cable. The threaded end of the bushing also includes a longitudinal slot. As the bushing is screwed into the housing passage the slot compresses causing the aperture at the end of the threaded portion of the bushing to clamp around the fiber optic cable. The clamping action physically connects the fiber optic cable to the electrical equipment housing.

10 Claims, 5 Drawing Sheets

MULTIPURPOSE OPTICAL FIBER CONNECTOR

FIELD OF THE INVENTION

The invention relates to connectors for use with fiber optic cable. More particularly, the invention relates to a single fiber optic connector for connecting a standard plastic covered fiber optic cable or an armored fiber optic cable to a housing for a sensor or an industrial control device.

BACKGROUND OF THE INVENTION

In the field of industrial controls and sensors, the use of fiber optic cable for connecting remote sensing devices to electrical control devices is fast becoming state-of-the-art technology. Depending on the environment in which a particular device is required to operate, the fiber optic connecting cable may have either a standard plastic cover or an armored (metal) cover. The fiber optic connecting cable is purchased from the device manufacturer and may include a connecting tip made to the device manufacturers specifications. At the present time there are no established standards for these connecting tips. Therefore, each manufacturer has connecting tips designed specifically for their equipment. To complicate the matter further, tips for standard plastic covered cable are not compatible with tips for armored cable. This requires the manufacturer to make and stock two models of each device, one to accept plastic covered cable and one to accept their armored cable.

SUMMARY OF THE INVENTION

An objective of the present invention is to provide a single housing connector for fiber optic cable which will accept both a standard plastic covered cable and an armored cable provided by the manufacturer. This fiber optic cable connector will eliminate the need for a manufacturer to make and stock two models of each device. The manufacturers inventory cost and space requirements can be cut in half.

Another objective of the invention is to provide an end to end fiber optic cable connector using parts common to the fiber optic housing connector. The end to end fiber optic cable connector of the present invention will connect plastic covered cable to plastic covered cable, plastic covered cable to the manufacturers armored cable, and the manufacturers armored cable to the manufacturers armored cable.

Other features and advantages of the invention will become apparent to those skilled in the art upon review of the following detailed description, claims and drawings.

Figure 1:
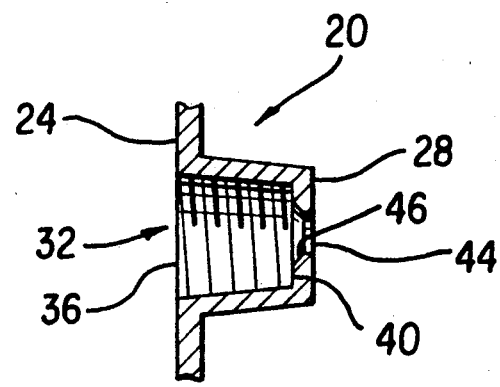
FIG. 1 is a cross sectional view of the housing portion passage.
Figure 2:
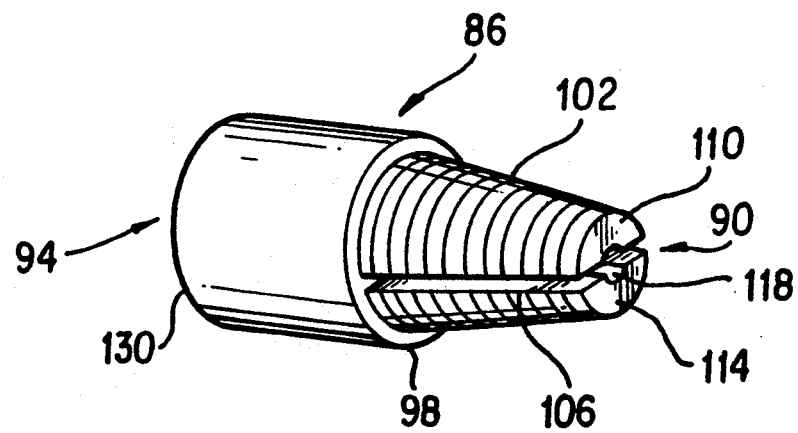
FIG. 2 is a isometric view of the bushing.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

The multipurpose fiber optic connector includes a housing portion 20 as shown in FIG. 1. The housing portion 20 includes an exterior surface 24 and an interior surface 28. A passage 32 connects the exterior surface 24 and the interior surface 28. The passage 32 has an exterior end 36 which coincides with the exterior surface 24 of the housing and an interior end 40. The interior end 40 has a slightly smaller diameter than the exterior end 36, therefor the passage 32 has a generally conical frustum shape pointed towards the interior end 40. The interior end 40 has an aperture 44 about in the center thereof. The aperture 44 is sized to receive a standard plastic covered fiber optic cable and includes a bevel 46 to permit easy insertion of the fiber optic cable. The passage 32 is threaded.

Figure 6:
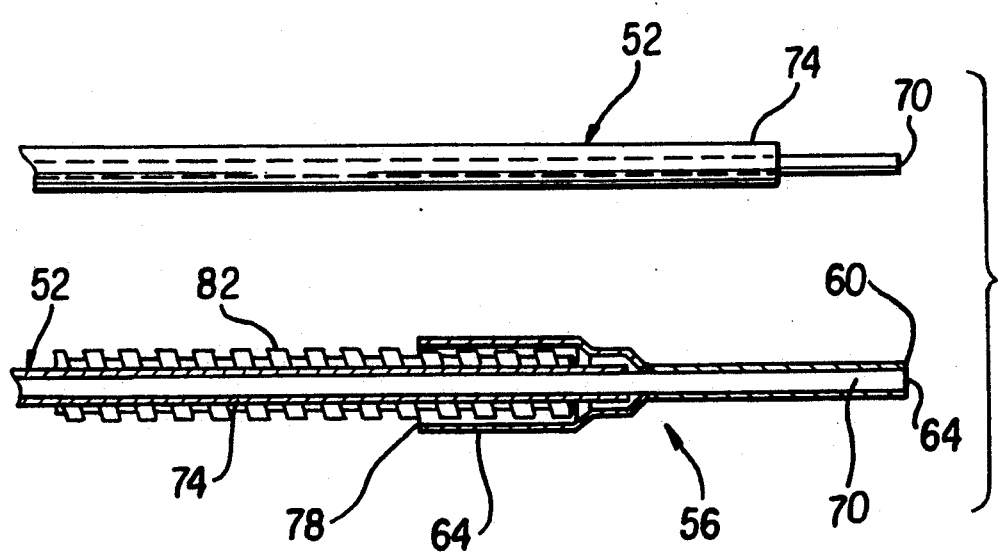
FIG. 6 is a cross sectional view of an armored fiber optic cable with an armored cable connecting tip installed.

A standard plastic covered plastic fiber optic cable 52 does not require a connecting tip 56 when used with the multipurpose fiber optic connector. Armored cable on the other hand does require a metal connecting tip 56 to maintain a completely armored cable. The armored cable connecting tip 56 shown in FIG. 6 is made of metal and has a first end 60 and a second end 64. The first end 60 has an outside diameter approximately equal to the outside diameter of a standard plastic covered plastic fiber optic cable 52. The first end 60 also includes an aperture 66 having an inside diameter sized to slidably portion 70 of the plastic covered receive a fiber optic cable 52 with the protective plastic cover 74 removed. The portion of the fiber optic cable 70 is attached to the connecting tip 56 by an adhesive such as epoxy. The second end 64 includes an aperture 78 sized to receive a flexible metallic sleeve 82 which covers and protects a standard plastic covered fiber optic cable 52.

Figure 3:
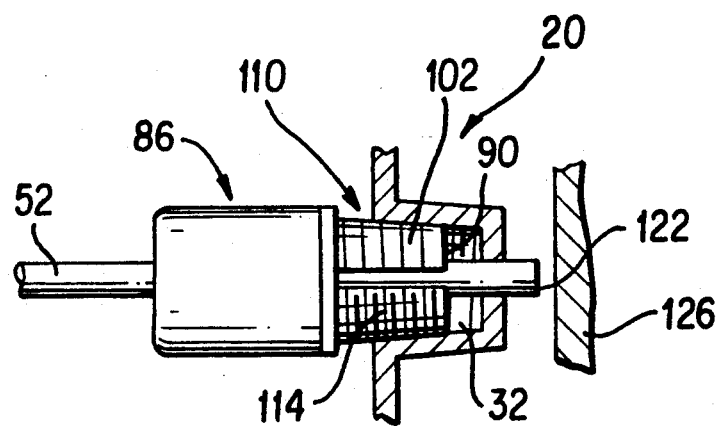
FIG. 3 is a cross sectional view of the housing portion passage with a bushing and a standard plastic coated plastic fiber optic cable partially installed.
Figure 4:
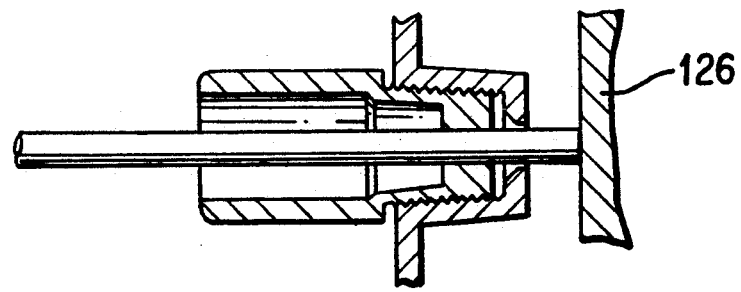
FIG. 4 is a cross sectional view of the housing portion passage with a bushing and a standard plastic coated plastic fiber optic cable fully installed.
Figure 5:
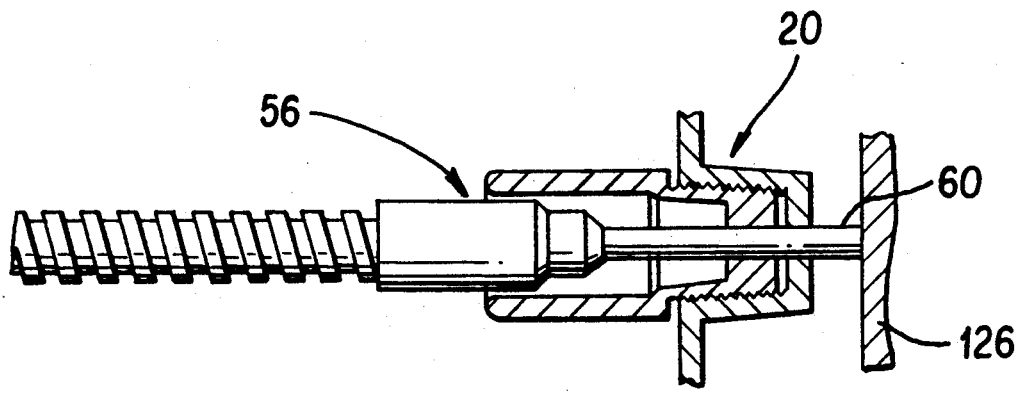
FIG. 5 is a partial cross sectional view of the housing portion passage with a bushing and an armored fiber optic cable having an armored connecting tip installed.

A bushing 86, generally tubular in shape as shown in FIG. 3 has a first end 90, a second end 94 and a midpoint 98 approximately half way between the first and second ends 90 and 94 respectively. The first end 90 is slightly smaller in diameter than the midpoint 98, therefor the generally tubular bushing 86 has a slightly tapered surface 102 between the midpoint 98 and the first end 90. The tapered surface 102 is threaded for being received in the passage 32 of the housing portion 20. A longitudinal slot 106 passes through the bushing 86 from the first end 90 to the midpoint 98 dividing the tapered surface 102 into a first halve 110 and a second half 114. The first end 90 also includes an aperture 118 about in the center thereof and sized for receiving a standard plastic covered fiber optic cable. As shown in FIGS. 3, 4, and 5 a portion of the plastic covered fiber optic cable 52 or the connecting tip 56 passes through the aperture 118. The bushing 86 is screwed into passage 32. As the bushing 86 is received approximately half way into the passage 32, as shown in FIG. 3, the first and second halves 110 and 114 respectively of the tapered surface 102 begin to come together at the first end 90 of the bushing 86. As the halves 110 and 114 come together the aperture 118 compresses around the plastic covered cable 52 or the first end 60 of the connecting tip 56 holding it firmly in place. Further insertion of the bushing 86 into the passage 32 causes an end 122 of the plastic covered fiber optic cable 52 or the first end 60 of the connecting tip 56 to firmly engage a preferred mating surface 126 immediately adjacent to the interior surface 28 and perpendicular to the axis of the passage 32 as shown in FIGS. 4 and 5 an end 124 of the fiber optic cable 70 is coincident with the first end 60 of the connecting tip 56.

The second end 94 of bushing 86 has an aperture 130 sized to receive the second end 64 of the connecting tip 56.

Figure 7:
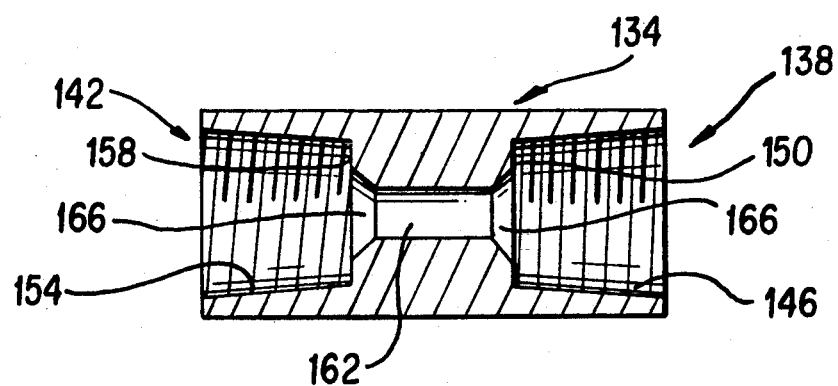
FIG. 7 is a partial cross sectional view of an end to end fiber optic cable connector body.
Figure 8:
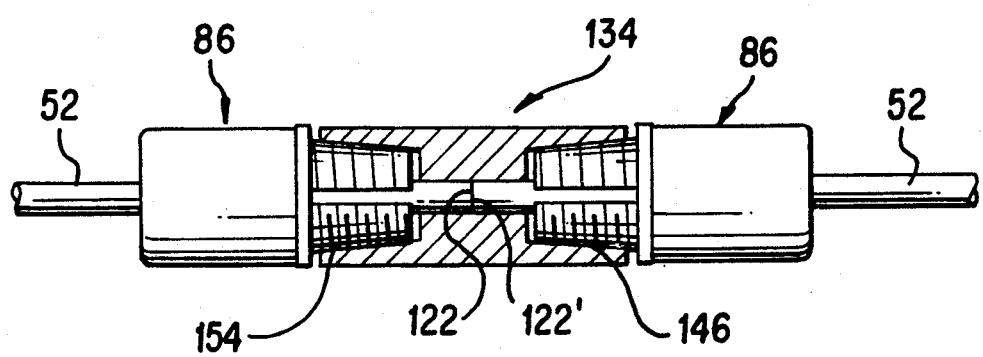
FIG. 8 is a partial cross sectional view of an end to end fiber optic cable connector having two standard plastic covered plastic fiber optic cable installed.
Figure 9:
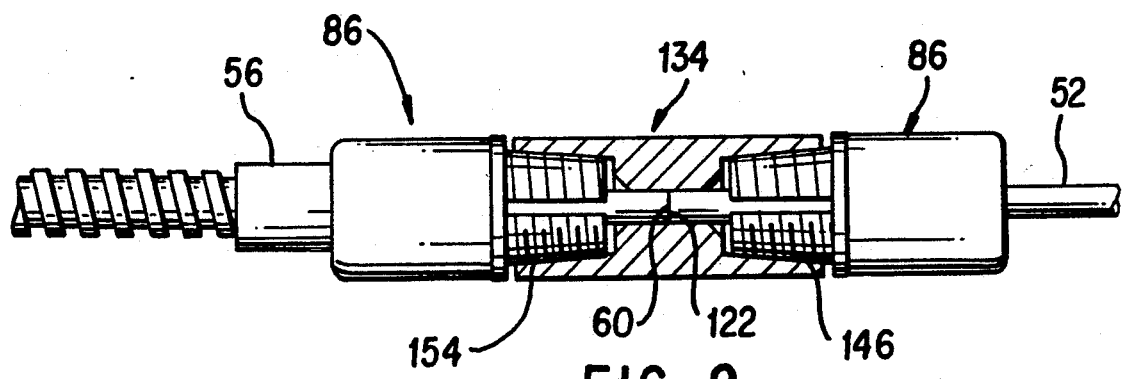
FIG. 9 is a partial cross sectional view of an end to end fiber optic cable connector having one standard plastic covered plastic fiber optic cables and one armored fiber optic cable having an armored cable connecting tip installed.

A connecting body 134 as shown in FIG. 7 is used to make an end-to-end fiber optic connection for any combination of standard plastic covered fiber optic cable and armored fiber optic cable having a connecting tip 56. The connecting body 134 has a first exterior end 138 and a second exterior end 142. The first exterior end 138 has a first threaded passage 146 ending in a first interior end 150. The second exterior end 142 has a second threaded passage 154 ending in a second interior end 158. The first and second threaded passages 146 and 154 respectively are generally shaped like a conical frustum having the larger diameter at the first and second exterior ends 138 and 142 respectively and the smaller diameter at the first and second interior ends 150 and 158 respectively. A passage 162 connects the first interior end 150 with the second interior end 158 and is sized to receive a standard plastic covered fiber optic cable. The passage 162 has a beveled entrance 166 on both the first and second interior end 150 and 158 respectively. As shown in FIGS. 8 and 9 each of the first and second threaded passages 146 and 154 respectively, receives a bushing 86. When the bushings 86 are fully inserted in the first and second passages 146 and 154 respectively the ends of the fiber optic cables 122 and 122' are forced together making an end-to-end connection. As shown in FIG. 9 the end to end connection can also be made using one standard plastic covered fiber optic cable 52 and one armored fiber optic cable with a connecting tip 56.

Figure 10:
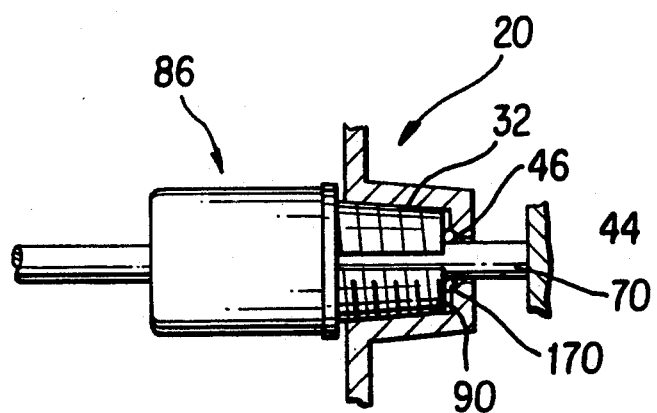
FIG. 10 is a partial cross sectional view of the housing portion passage with a bushing, a standard plastic coated plastic fiber optic cable, and a sealing ring between the bushing and the interior end of the passage.

In some environments a liquid tight seal is required at the cable connection point. As shown in FIG. 10 a donut-shaped O-ring 170 sized to fit snugly around a bare fiber optic cable 70 is placed around the cable 70 at the first end 90 of the bushing 86. As the bushing 86 is screwed into the passage 32 of the housing portion 20 the O-ring 170 is compressed into the bevel 46 by the first end 90 of the bushing 86 thereby sealing the aperture 44 against the ingress of liquids. The O-ring may also be used with the connector body 134 to provide a liquid tight end-to-end connection.

I claim:

1. A multipurpose fiber optic cable connector for connecting either a standard plastic covered fiber optic cable without a cable connecting tip or an armored fiber optic cable having a cable connecting tip to a housing for electrical or electronic equipment, said connector comprising:
   a. a portion of the housing having an interior surface, an exterior surface, and a generally conical frustum shaped passage connecting said interior and said exterior surfaces;
   b. a bushing, generally tubular in shape and having an axial passage through the center thereof for receiving, clamping, and biasing either the standard plastic covered fiber optic cable without a connecting tip or the armored fiber optic cable with said cable connecting tip, said bushing is axially aligned and received in said passage of said housing portion; and,
   c. a preferred mating surface immediately adjacent said interior surface of said housing portion and being perpendicular to the axis of said passage of said housing portion such that one end of the fiber optic cable or one end of said connecting tip will abut said preferred mating surface when biased by said bushing.

2. The connector of claim 1 wherein said cable connecting tip of the armored fiber optic cable is made of metal and is generally a hollow tubular shaped enclosure, said connecting tip comprises:
   a. a first end having an inside diameter sized to slidably receive a portion of a standard plastic fiber optic cable having the protective plastic cover removed, from the cable, and an outside diameter approximately equal to the outside diameter of the protective plastic cover of the standard plastic fiber optic cable, said first end being slidably received in said passage of said bushing for biasing against said preferred mating surface;
   b. means for attaching the portion of the plastic fiber optic cable having the protective cover removed to said first end of said cable connecting tip such that an end of the fiber optic cable is coincident with said first end of said connector tip; and
   c. a second end having an inside diameter sized to slidably received a flexible metal sleeve which slides over and protects a standard plastic covered fiber optic cable.

3. The connector of claim 2 wherein said passage of the housing portion is threaded and further comprises:
   a. an exterior end flush with said exterior surface of said housing portion; and
   b. an interior end having a diameter slightly smaller than said exterior end and having an aperture about in the center thereof, said aperture sized to receive either a standard plastic covered fiber optic cable or said first end of said cable connecting tip said aperture having a bevel to permit easy insertion of either the standard plastic covered fiber optic cable or said first end of said connecting tip.

4. The connector of claim 3 wherein said bushing further comprises:
   a. a first end having an aperture approximately in the center thereof, said aperture sized for receiving either a standard plastic covered fiber optic cable or said first end of said cable connecting tip of an armored fiber optic cable;

b. a second end having an aperture approximately in the center thereof, said aperture sized for receiving said second end of said cable connecting tip, said aperture of said first end and said aperture of said second end being connected by said passage;

c. a midpoint being approximately half way between said first and second ends;

d. a threaded exterior surface extending between said first end and said midpoint and being tapered such that said first end has a diameter smaller than the diameter of said midpoint, said threaded surface cooperates with said threaded passage of said housing portion; and e. a slot running longitudinally between said first end and said midpoint, said slot compresses as said busing is screwed into said passage causing said aperture of said first end of said busing to clamp tightly around either the plastic covering of the fiber optic cable or said first end of said connecting tip passing through said aperture, further insertion of said bushing biases either an end of the plastic covered fiber optic cable or said first end of said connecting tip against said preferred mating surface.

5. A fiber optic connector for end to end connection of two standard plastic covered fiber optic cables without connecting tips, one standard plastic covered fiber optic cable without a connecting tip and one armored plastic fiber optic cable having a cable connecting tip, or two armored plastic fiber optic cables each having a cable connecting tip, said connector comprising:

a. a body, having a first exterior end, a first interior end, a first threaded passage connecting said first exterior and interior ends, a second exterior end, a second interior end, a second threaded passage connecting said second exterior and interior ends, and a passage connecting said first and second interior ends, and b. a pair of bushing, each generally tubular in shape and having a passage through the center thereof for receiving, clamping, and biasing either the standard plastic covered fiber optic cable without a connecting tip or the armored fiber optic cable having said cable connecting tip, each said bushing being received in one of said first or second threaded passages of said body.

6. The connector of claim 5 wherein said cable connecting tip of the armored fiber optic cable is made of metal and generally tubular in shape, said connecting tip comprises:

a. a first end having an inside diameter sized to slidably receive a portion of a standard plastic fiber optic cable having the protective plastic cover removed, and an outside diameter approximately equal to the outside diameter of the protective plastic cover of the standard plastic fiber optic cable, said first end being slidably received in said passage of said bushing for biasing against either an end of a plastic fiber optic cable or said first end of said connecting tip of another armored fiber optic cable being clamped and biased by the other of said bushings;

b. means for attaching the portion of the plastic fiber optic cable having the protective cover removed to said first end of said cable connecting tip such that an end of the fiber optic cable is coincident with said first end of said connector tip; and, c. a second end having an inside diameter sized to slidably receive a flexible metal sleeve which slides over and protects a standard plastic covered fiber optic cable.

7. The connector of claim 6 wherein said body further comprises:

a) a first exterior end having an aperture in about the center thereof sized for receiving said second end of said cable connecting tip;

b) a second exterior end having an aperture in about the center thereof sized for receiving said second end of said cable connecting tip;

c) a first interior end having an aperture in about the center thereof sized for receiving a standard plastic covered fiber optic cable or said first end of said cable connecting tip, said first interior end and said first exterior end connected by a tapered passage having a threaded surface;

d) a second interior end having an aperture in about the center thereof sized for receiving a standard plastic covered fiber optic cable or said first end of said cable connecting tip, said second interior end and said second exterior end connected by a tapered passage having a threaded surface, said apertures of said first and second interior ends communicating by said longitudinal passage.

8. The connector of claim 6 wherein said first and second threaded passages of said body are generally shaped like a conical frustum, having the larger diameters at said first and second exterior ends and the smaller diameters at said first and second interior ends.

9. The connector of claim 8 wherein said passage connecting said first and second interior ends of said body intersects each of said first and second interior ends at about the center thereof, said passage is sized to slidably receive either the plastic covered fiber optic cable or said first end of said connecting tip such that the ends are aligned and abut, and said passage includes a beveled entrance at the point of intersection with said first and second interior ends for permitting an easier insertion of either the plastic covered fiber optic cable or said first end of said connecting tip.

10. The connector of claim 9 wherein each said bushing further comprises:

a. a first end having an aperture approximately in the center thereof, said aperture sized for receiving either a standard plastic covered fiber optic cable or said first end of said cable connecting tip of an armored fiber optic cable;

b. a second end having an aperture approximately in the center thereof, said aperture sized for receiving said second end of said cable connecting tip, said aperture of said first end and said aperture of said second end being connected by said passage;

c. a midpoint being approximately half way between said first and second ends;

d. a threaded exterior surface extending between said first end and said midpoint and being tapered such that said first end has a diameter smaller than the diameter of said midpoint, said threaded surface cooperates with either of said threaded passages of said body; and, e. a slot running longitudinally between said first end and said midpoint, said slot compresses as said bushing is screwed into said threaded passage causing said aperture of said first end of said bushing to clamp tightly around either the plastic covering of the fiber optic cable or said first end of said connecting tip passing through said aperture.

* * * * *